(12) United States Patent
Kim et al.

(10) Patent No.: US 12,422,379 B2
(45) Date of Patent: Sep. 23, 2025

(54) SIDE SURFACE INSPECTION DEVICE OF CYLINDRICAL BATTERY

(71) Applicant: LG ENERGY SOLUTION, LTD., Seoul (KR)

(72) Inventors: Jiwon Kim, Daejeon (KR); Tae Young Kim, Daejeon (KR); Seung Gyun Hong, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 23 days.

(21) Appl. No.: 18/579,687

(22) PCT Filed: Aug. 16, 2022

(86) PCT No.: PCT/KR2022/012200
§ 371 (c)(1),
(2) Date: Jan. 16, 2024

(87) PCT Pub. No.: WO2023/068509
PCT Pub. Date: Apr. 27, 2023

(65) Prior Publication Data
US 2024/0345000 A1  Oct. 17, 2024

(30) Foreign Application Priority Data
Oct. 20, 2021  (KR) .................. 10-2021-0140139

(51) Int. Cl.
*G01N 21/952* (2006.01)
*G01N 21/88* (2006.01)
*H01M 10/42* (2006.01)

(52) U.S. Cl.
CPC ....... *G01N 21/952* (2013.01); *G01N 21/8806* (2013.01); *G01N 2201/102* (2013.01); *G01N 2201/1056* (2013.01); *H01M 10/4285* (2013.01)

(58) Field of Classification Search
CPC ............ G01N 21/952; G01N 21/8806; G01N 2201/102; G01N 2201/1056; G01N 21/88;
(Continued)

(56) References Cited

U.S. PATENT DOCUMENTS 5,570,183 A * 10/1996 Wiles ................. G01B 11/30
356/613
6,160,906 A    12/2000 Lehnan et al.
(Continued)

FOREIGN PATENT DOCUMENTS

EP       1027590 B1 *  6/2009  ............ G02B 17/02
JP       H6-160054 A    6/1994
(Continued)

OTHER PUBLICATIONS

International Search Report (with partial translation) and Written Opinion dated Nov. 25, 2022 issued in International Patent Application No. PCT/KR2022/012200.
(Continued)

*Primary Examiner* — Abdullahi Nur
(74) *Attorney, Agent, or Firm* — Morgan, Lewis & Bockius LLP (57) ABSTRACT

A side surface inspection device is provided for a cylindrical battery having a side surface defining first to fourth areas. The side surface inspection device includes a first light to emit light toward the side surface of the cylindrical battery; a plurality of mirrors having a first to fourth mirrors that each reflect light emitted from the first light to be incident on each of the first to fourth areas, respectively, of the cylindrical battery, and are configured to reflect light reflected by each of the first to fourth areas, respectively, of the cylindrical battery; and a camera to receive the light reflected by each of the plurality of mirrors and configured to form an
(Continued)

image including images of the first to fourth areas of the cylindrical battery.

9 Claims, 5 Drawing Sheets

(58) Field of Classification Search
CPC ........ G01N 21/954; G01N 2201/1053; H01M 10/4285; H01M 50/107; Y02E 60/10
See application file for complete search history.

(56) References Cited

U.S. PATENT DOCUMENTS

| | | | |
|---|---|---|---|
| 2004/0066505 A1* | 4/2004 | Berg | G01N 21/952 356/237.1 |
| 2011/0169944 A1 | 7/2011 | Zhao et al. | |

FOREIGN PATENT DOCUMENTS

| | | |
|---|---|---|
| JP | 2000-241363 A | 9/2000 |
| JP | 2003-156453 A | 5/2003 |
| JP | 2007-017194 A | 1/2007 |
| JP | 4619880 B2 | 1/2011 |
| JP | 2016-142592 A | 8/2016 |
| JP | 2017173048 A * | 9/2017 |
| KR | 10-2002-0093507 A | 12/2002 |
| KR | 10-0605051 B1 | 7/2006 |
| KR | 10-1327217 B1 | 11/2013 |
| KR | 10-1525700 B1 | 6/2015 |
| KR | 10-1803109 B1 | 11/2017 |
| KR | 10-2018-0035484 A | 4/2018 |
| KR | 10-2202469 B1 | 1/2021 |
| KR | 10-2021-0083686 A | 7/2021 |
| KR | 10-2021-0103180 A | 8/2021 |

OTHER PUBLICATIONS

Office Action dated Dec. 23, 2024 issued in Japanese Patent Application No. 2024-502667. Note: KR 2002-0093507 A and JP 2007-017194 A.
Office Action dated Dec. 31, 2024 issued in Korean Patent Application No. 10-2021-0140139. Note: KR 2002-0093507 A and JP 2007-017194 A.
Extended European Search Report dated Oct. 2, 2024 issued in European Patent Application No. 22883737.3. Note: KR 10-2002-0093507 A.
Ali, M.H.A., et al., "Visual Inspection of Cylindrical Product's Lateral Surface using Cameras and Image Processing", International Journal of Mathematical Models and Methods in Applied Sciences, Jan. 3, 2012, pp. 339-348, vol. 6, No. 2.

* cited by examiner

SIDE SURFACE INSPECTION DEVICE OF CYLINDRICAL BATTERY

TECHNICAL FIELD

The present application claims the benefit of priority based on Korean Patent Application No. 10-2021-0140139 filed on Oct. 20, 2021, the entire contents of which are incorporated herein by reference.

The present disclosure relates to a side surface inspection device of a cylindrical battery. More specifically, the present disclosure relates to a cylindrical battery side surface inspection device capable of performing an exterior inspection of a side surface without rotating and rolling a cylindrical battery.

BACKGROUND ART

With increasing technological development and demand for mobile devices, rechargeable secondary batteries are widely used as energy sources for various mobile devices. In addition, the secondary batteries are attracting attention as an energy source for an electric vehicle and a hybrid vehicle, which are proposed as measures for solving air pollution caused by existing gasoline vehicles and diesel vehicles.

The secondary batteries are classified into a coin-shaped battery, a cylindrical battery, a prismatic battery, and a pouch-shaped battery depending on the shape of the battery case. Among them, when inspecting the side surface exterior of the cylindrical battery, it is required to rotate or roll the battery by 360 degrees to obtain an image, and there is a problem that noise is generated in the image when the battery is rotated or rolled, resulting in the degradation of the image quality and detectability of the inspection device.

PRIOR ART DOCUMENT

Patent Document (Patent Document 1) Korean Laid-open Patent Publication No. 10-2021-0103180 (Aug. 23, 2021)

DISCLOSURE

Technical Problem

One object of the present disclosure is to provide a cylindrical battery side surface inspection device capable of performing a side surface exterior inspection without rotating and rolling the cylindrical battery.

Another object of the present disclosure is to provide a cylindrical battery side surface inspection device that can prevent image noise and improve image quality and detectability of the inspection device.

Technical Solution

In order to solve the above problems, in an embodiment of the present invention, there is provided a side surface inspection device of a cylindrical battery which has a first area that is a part of a side surface, a second area that is another part of the side surface, a third area that is still another part of the side surface, and a fourth area that is a remaining part of the side surface, wherein the first area, the second area, the third area, and the four area being adjacent to each other and arranged sequentially along a circumference. The side surface inspection device includes a first lighting which emits light in a direction toward the side surface of the cylindrical battery; a plurality of mirrors including a first mirror, a second mirror, a third mirror, and a fourth mirror which reflect light emitted from the first lighting to make the light incident on each of the first area, the second area, the third area and the fourth area of the cylindrical battery, and reflect the lights reflected by each of the first area, the second area, the third area, and the fourth area of the cylindrical battery again; and a camera on which light reflected by each of the plurality of mirrors again is incident and which forms an image including images of the first area, the second area, the third area and the fourth area of the cylindrical battery.

Advantageous Effects

According to one of the effects of the present disclosure, it is possible to provide a cylindrical battery side surface inspection device capable of performing a side surface exterior inspection without rotating or rolling the cylindrical battery.

According to another effect of the present disclosure, it is possible to provide a cylindrical battery side surface inspection device that can prevent image noise and improve image quality and detectability of the inspection device.

BEST MODE

Hereinafter, the embodiments of the present invention will be described in detail with reference to the accompanying drawings. For convenience of explanation, all or part of the configurations may exaggerate in the drawings.

Furthermore, the present invention is not limited to the accompanying drawings or the contents described in this specification, and it is obvious to those skilled in the art that the present invention can be embodied in various forms without departing from the technical spirit of the present invention.

Figure 1:
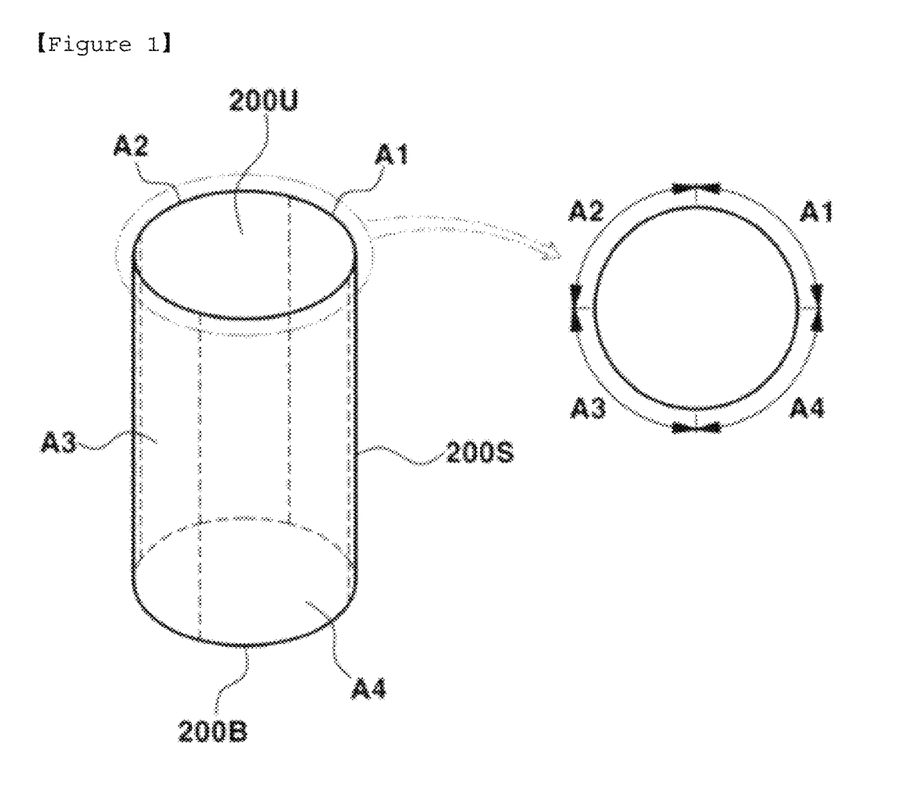
FIG. 1 is a schematic diagram of a cylindrical battery.

FIG. 1 is a schematic diagram of a cylindrical battery.

Referring to the drawings, a cylindrical battery 200 has a generally cylindrical shape. The cylindrical battery 200 has one surface 200U, the other surface 200B opposite to the one surface 200U, and a curved side surface 200S that connects the one surface 200U and the other surface 200B.

In this specification, the cylindrical battery 200 is described to have a first area A1 that is a part of the side surface 200S, a second area A2 that is another part of the side surface 200S, and a third area A3 that is still another part of the side surface 200S, and a fourth area A4 which is the remaining portion of the side surface 200S. The first area A1, the second area A2, the third area A3, and the fourth area A4 are adjacent to each other and sequentially disposed along a circumference of the cylindrical battery 200. However, the first area A1, the second area A2, the third area A3 and the fourth area A4 have a configuration that is introduced to distinguish each area of the side surface 200S of the cylindrical battery 200 from each other. The first area A1, the second area A2, the third area A3, and the fourth area A4 do not have boundaries that are mutually visually confirmed.

Each of the first area A1, the second area A2, the third area A3, and the fourth area A4 may be areas obtained by dividing the side surface 200S of the cylindrical battery 200 into four equal parts. In other words, each of the first area A1, the second area A2, the third area A3, and the fourth area A4 can be each of the side surfaces of each portion when divided into four equal parts along a cutting plane passing through q central axis of the cylindrical battery 200. Therefore, each of the first area A1, the second area A2, the third area A3 and the fourth area A4 can have substantially the same area as each other.

Figure 2:
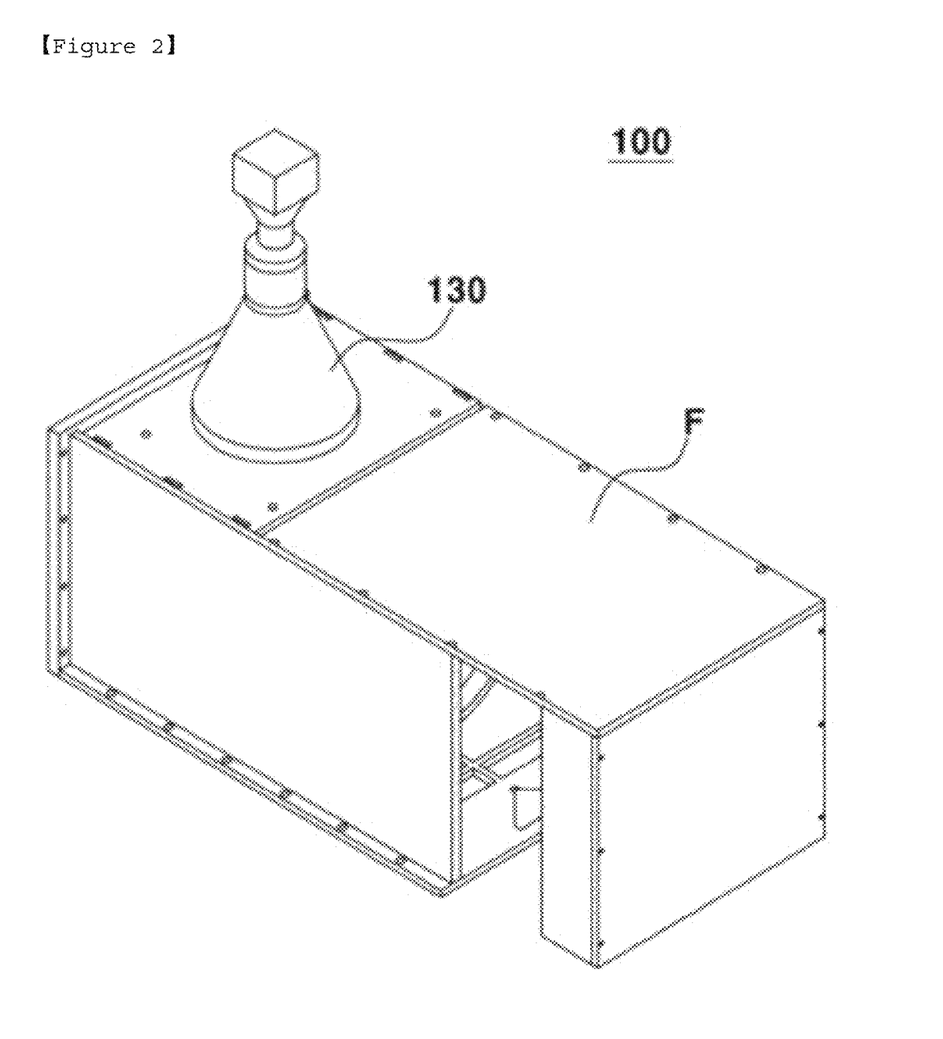
FIG. 2 is a perspective view of a cylindrical battery side surface inspection device according to an embodiment of the present invention.

FIG. 2 is a perspective view of the cylindrical battery side surface inspection device according to an embodiment of the present invention.

Figure 3:
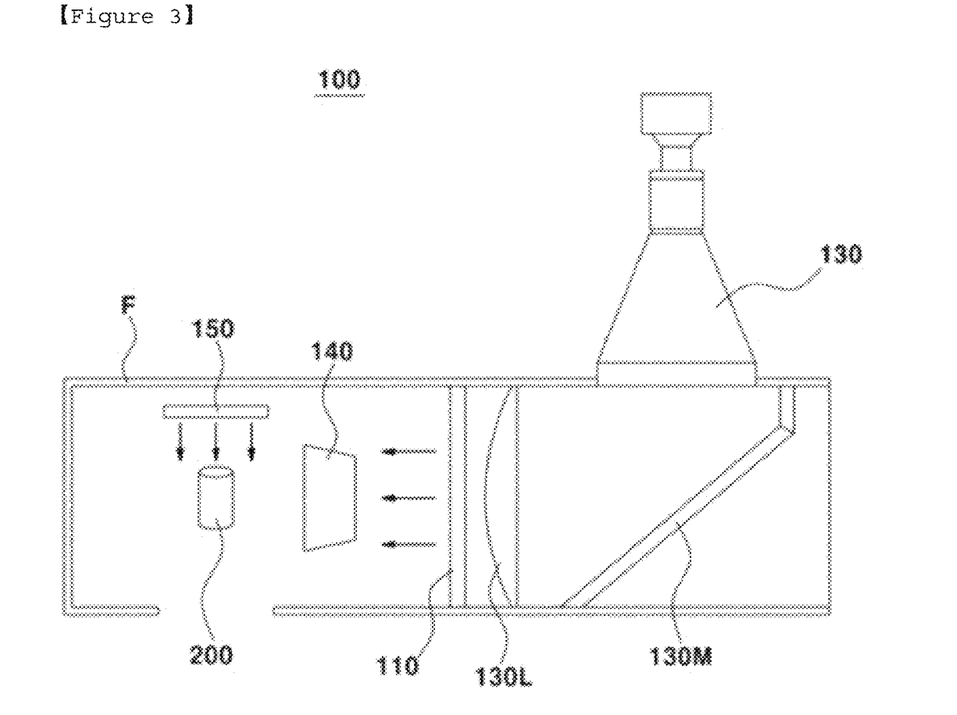
FIG. 3 is a cross-sectional view of the cylindrical battery side surface inspection device according to an embodiment of the present invention.

FIG. 3 is a cross-sectional view of the cylindrical battery side surface inspection device according to an embodiment of the present invention.

Figure 4:
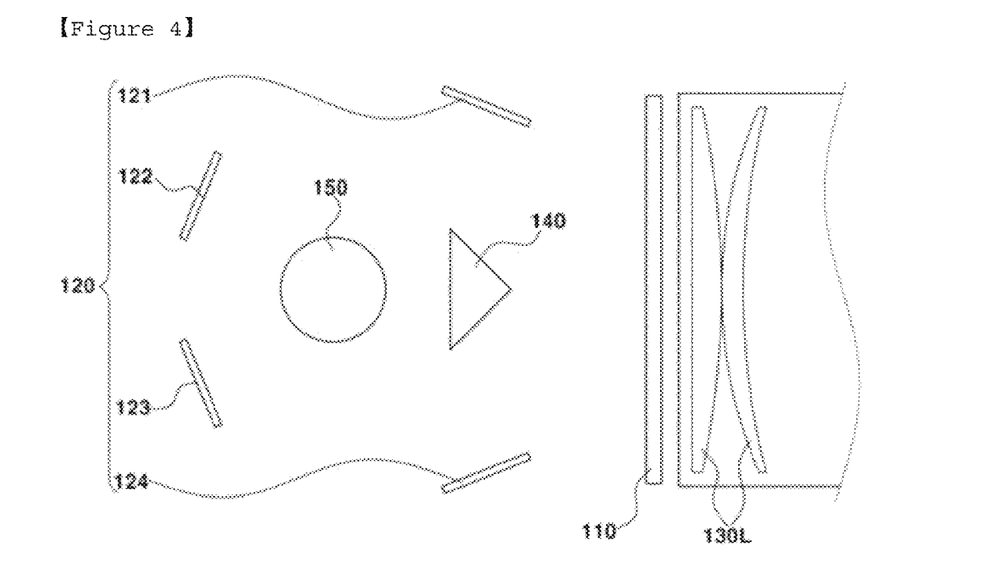
FIG. 4 is an enlarged plan view of a part of the cylindrical battery side surface inspection device according to an embodiment of the present invention.

FIG. 4 is an enlarged plan view of a part of the cylindrical battery side surface inspection device according to an embodiment of the present invention.

Referring to the drawings, a cylindrical battery side surface inspection device 100 according to an embodiment of the present invention includes at least one of a first lighting 110, a plurality of mirrors 120, a camera 130 including a lens 130L, a prism (140) and a second lighting 150. As shown in the drawings, these configurations can be disposed on the cross-section in the order of the cylindrical battery 200, the prism 140, the first lighting 110, and the lens 130L of the camera 130. The cylindrical battery side surface inspection device 100 is, of course, for inspecting the side surface of the cylindrical battery 200 described above.

The above-described configurations of the cylindrical battery side surface inspection device 100 may be disposed by being connected to the frame F, such as being disposed inside the frame F or being disposed on the frame F. The frame F can configure the exterior of the cylindrical battery side surface inspection device 100. Therefore, the cylindrical battery side surface inspection device 100 can be configured with one module.

The first lighting 110 emits light in a direction toward the side surface 200S of the cylindrical battery 200 (a leftward direction on the basis of FIG. 3).

The first lighting 110 may be disposed to face the cylindrical battery 200 between the cylindrical battery 200 and the lens 130L of the camera 130, which will be described later. The expression "the first lighting 110 is disposed to face the cylindrical battery 200" is not meant to exclude disposition of other arrangements between the first lighting 110 and the cylindrical battery 200. For example, a prism 140 can be placed between the first lighting 110 and the cylindrical battery 200 as shown in the drawings.

At this time, the first lighting 110 is disposed to face the side surface 200S of the cylindrical battery 200, and specifically, can be placed to face the first area A1 and the fourth area A4 of the cylindrical battery 200, as shown in FIG. 5. The first lighting 110 can emit light to at least one of the plurality of mirrors 120 and prisms 140. However, the prism 140 can be placed between the cylindrical battery 200, and the first lighting 110 may not directly emit light to the cylindrical battery 200. The light emitted from the first lighting 110 can be indirectly emitted to the cylindrical battery 200 through the plurality of mirrors 120 and/or prisms 140.

A part of the light emitted from the first lighting 110 is incident on the lens 130L of the camera 130 via the prism 140, the first mirror 121, the first area A1 of the cylindrical battery 200, the first mirror 121 and the prism 140. Another part of the light emitted from the first lighting 110 is incident on the lens 130L of the camera 130 via the second mirror 122, the second area A2 of the cylindrical battery 200, and the second mirror 122. Still another part of the light emitted from the first lighting 110 is incident on the lens 130L of the camera 130 via the third mirror 123, the third area A3 of the cylindrical battery 200, and the third mirror 123. Still another part of the light emitted from the first lighting 110 can be incident on the lens 130L of the camera 130 via the prism 140, the fourth mirror 124, the fourth area A4 of the cylindrical battery 200, the fourth mirror 124 and the prism 140. A path of light emitted from the first lighting 110 is shown in detail in FIG. 5.

The first lighting 110 may be a coaxial light. That is, the first lighting 110 may be disposed such that the light emitted from the first lighting 110 and reflected by the cylindrical battery 200 faces the lens 130L of the camera 130.

The plurality of mirrors 120 include a first mirror 121, a second mirror 122, a third mirror 123, and a fourth mirror 124 that each reflect the light emitted from the first lighting 110 to enter each of the first area A1, the second area A2, the third area A3, and the fourth area A4 of the cylindrical battery 200, and reflect the light reflected from each of the first area A1, the second area A2, the third area A3, and the fourth area A4 of the cylindrical battery 200 again. The first mirror 121, the second mirror 122, the third mirror 123, and the fourth mirror 124 are spaced apart from the side surface 200S of the cylindrical battery 200 by a predetermined distance, and can be disposed toward each of the first area A1, the second area A2, the third area A3 and the fourth area A4 of the cylindrical battery 200, respectively. However, the number, the arrangement form, or the like of the plurality of mirrors 120 can be changed depending on the design.

That is to say, the first mirror 121 reflects the light emitted from the first lighting 110 to enter the first area A1 of the cylindrical battery 200, and reflects the light reflected from the first area A1 of the cylindrical battery 200 again. The second mirror 122 reflects the light emitted from the first lighting 110 to enter the second area A2 of the cylindrical battery 200, and reflects light reflected from the second area A2 of the cylindrical battery 200 again. The third mirror 123 reflects the light emitted from the first lighting 110 to enter the third area A3 of the cylindrical battery 200, and reflects the light reflected from the third area A3 of the cylindrical battery 200 again. The fourth mirror 124 reflects the light emitted from the first lighting 110 to enter the fourth area A4 of the cylindrical battery 200, and reflects the light reflected from the fourth area A4 of the cylindrical battery 200 again.

At this time, at least one of the lights incident on the first mirror 121, the second mirror 122, the third mirror 123, and the fourth mirror 124 may be light that is emitted from the first lighting 110 and reflected by the prism 140. For example, the light incident on the first mirror 121 and the fourth mirror 124 may be light emitted from the first lighting 110 and reflected by the prism 140.

Similarly, at least one of the light reflected by the cylindrical battery 200 and reflected again after entering each of the first mirror 121, the second mirror 122, the third mirror 123 and the fourth mirror 124 may be reflected again by the prism 140. For example, the light reflected by the cylindrical battery 200 and reflected again after being incident on each of the first mirror 121 and the fourth mirror 124 may be reflected again by the prism 140.

Light reflected by the cylindrical battery 200 and reflected by each of the plurality of mirrors 120 enters the camera 130. It will be evident that light reflected by each of the plurality of mirrors 120 is incident in a direction facing the lens 130L of the camera 130. Accordingly, the camera 130 forms an image including all images of the first area A1, the second area A2, the third area A3, and the fourth area A4 of the cylindrical battery 200. That is, the camera 130 can form a single image such that the images of each area of the side surface 200S of the cylindrical battery 200 are included in the same frame.

The lens 130L of the camera 130 may be an L-shaped lens including a lens mirror 130M that reflects light incident on the lens 130L. The lens mirror 130M may be placed to form an angle of approximately 45° with the lens 130L. Therefore, the light incident on the lens 130L can be reflected to the upper side by the lens mirror 130M on the basis of FIG. 3 to form an image.

The prism 140 can adjust paths of at least a part of the light emitted from the first lighting 110 and incident on the plurality of mirrors 120 and at least a part of the light reflected by the cylindrical battery 200 and reflected by the plurality of mirrors 120 again. In other words, the prism 140 adjusts the path of at least a part of the light emitted from the first lighting 110 such that the light emitted from the first lighting 110 can be incident on each of the first mirror 121, the second mirror 122, the third mirror 123, and the fourth mirror 124. Also, the prism 140 adjusts the path of at least one of light reflected by the cylindrical battery 200 and reflected by each of the first mirror 121, the second mirror 122, the third mirror 123 and the fourth mirror 124 again such that light reflected by each of the first mirror 121, the second mirror 122, the third mirror 123, and the fourth mirror 124 again can be incident on the lens 130L of the camera 130.

The prism 140 may be placed to face the first lighting 110 between the cylindrical battery 200 and the first lighting 110. Therefore, the path of at least a part of the light emitted from the first lighting 110 can be adjusted. Also, the prism 140 can be disposed to face the lens 130L of the camera 130 between the cylindrical battery 200 and the lens 130L of the camera 130. At this time, a distance between the prism 140 and the first lighting 110 may be shorter than a distance between the prism 140 and the lens 130L of the camera 130. That is, these configurations can be disposed in the order of the cylindrical battery 200, the prism 140, the first lighting 110, and the lens 130L of the camera 130 on the cross section. Accordingly, at least a part of the light reflected by the cylindrical battery 200 and reflected by the plurality of mirrors 120 again can be adjusted to enter the lens 130L of the camera 130.

The second lighting 150 can be disposed on one surface 200U of the cylindrical battery 200. Preferably, the second lighting 150 can be disposed to overlap the cylindrical battery 200 in a plane. The second lighting 150 can play a role of improving the visibility of the cylindrical battery 200 by emitting light to the cylindrical battery 200. The second lighting 150 can be a ring light. The second lighting 150 may be disposed by being connected to the frame F, but is not limited thereto, and the arrangement method of the second lighting 150 may be modified depending on the design.

The cylindrical battery side surface inspection device 100 may further include a transport means (not shown) for supporting the cylindrical battery 200 at the time of inspection and transporting the cylindrical battery 200 after inspection.

On the other hand, in general, when inspecting the side surface exterior of the cylindrical battery, the battery needs to be rotated or rolled by 360° to acquire an image, and when the battery rotates or rolls, there is a problem that noise is generated in the image, resulting in degradation of the image quality and detectability of the inspection device.

The cylindrical battery side surface inspection device 100 according to an embodiment of the present invention can inspect the exterior through a single image including all images of each area of the side surface 200S of the cylindrical battery 200, by utilizing the lights 110 and 150 and the mirror 120. Therefore, the side surface exterior inspection can be performed without rotating or rolling the cylindrical battery. Accordingly, it is possible to prevent image noise and improve the image quality and the detectability of the inspection device.

FIG. 5 shows the optical path of the cylindrical battery side surface inspection device according to an embodiment of the present invention. For convenience of explanation, the second lighting 150 is omitted from the drawing.

Figure 5A:
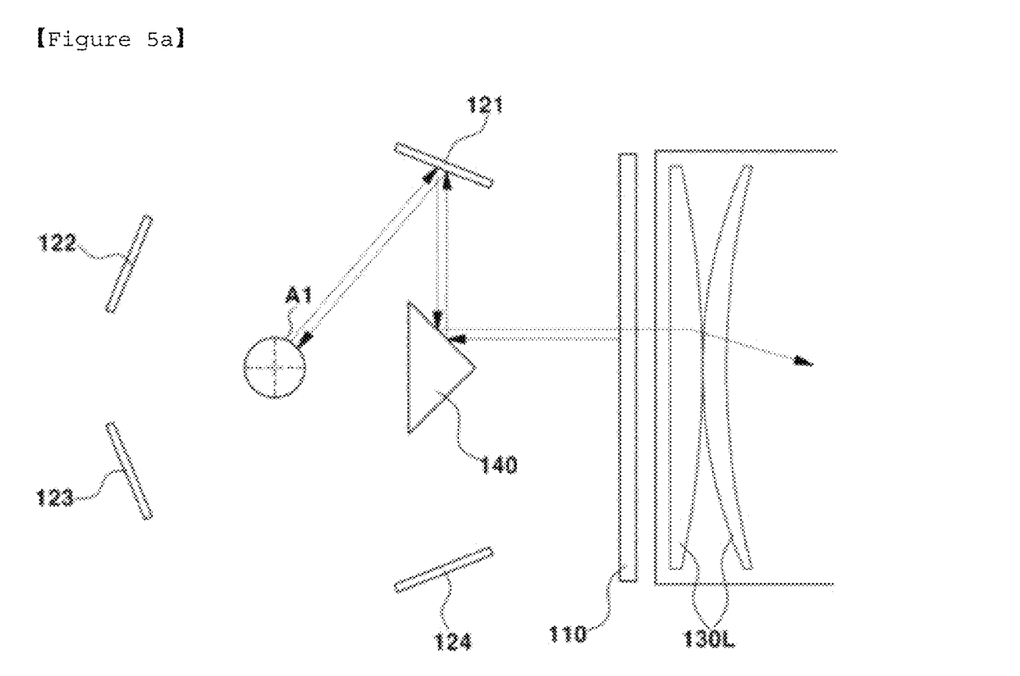
FIG. 5 shows an optical path of the cylindrical battery side surface inspection device according to an embodiment of the present invention.

FIG. 5(a) shows the path of light reflected after entering the first area A1 of the cylindrical battery 200.

Referring to the drawing, a part of the light emitted from the first lighting 110 is incident on the lens 130L of the camera 130 via the prism 140, the first mirror 121, the first area A1 of the cylindrical battery 200, the first mirror 121, and the prism 140. Specifically, a part of the light emitted from the first lighting 110 is incident on the prism 140 and then reflected and incident on the first mirror 121, and the light incident on the first mirror 121 is reflected again and incident on the first area A1 of the cylindrical battery 200. The light incident on the first area A1 of the cylindrical battery 200 is reflected and incident on the first mirror 121, and the light incident on the first mirror 121 is reflected again and incident on the prism 140, and them is reflected again and incident on the lens 130L of the camera 130.

Figure 5B:
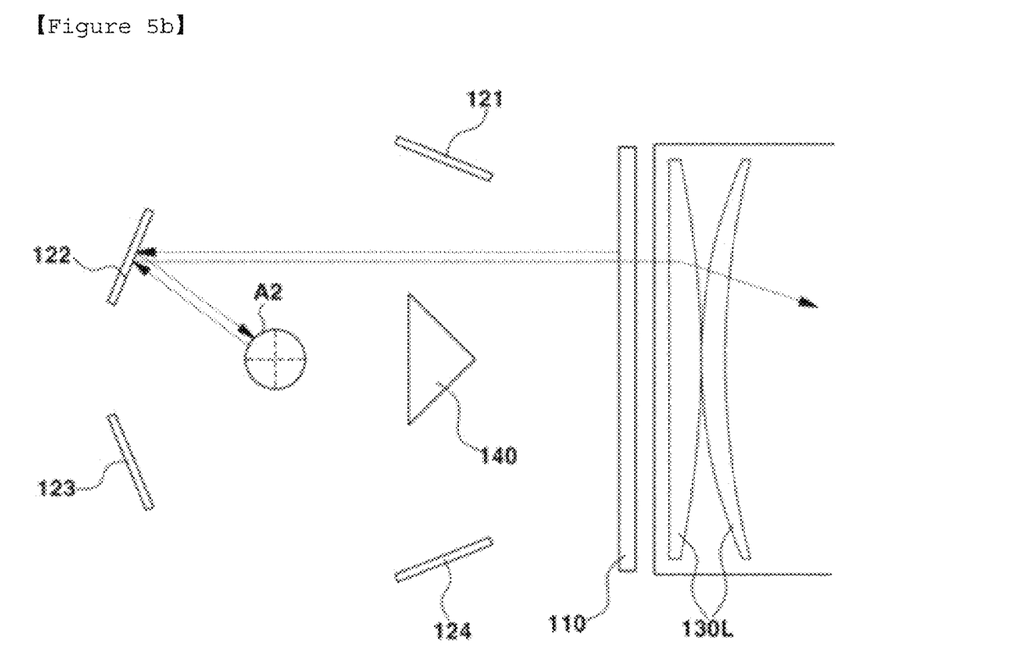

FIG. 5(b) shows the path of light reflected after entering the second area A2 of the cylindrical battery 200.

Referring to the drawing, another part of the light emitted from the first lighting 110 is incident on the lens 130L of the camera 130 via the second mirror 122, the second area A2 of the cylindrical battery 200, and the second mirror 122. Specifically, another part of the light emitted from the first lighting 110 is incident on the second mirror 122, then reflected, and incident on the second area A2 of the cylindrical battery 200. The light incident on the second area A2 of the cylindrical battery 200 is reflected again, incident on the second mirror 122, then reflected again, and incident on the lens 130L of the camera 130.

Figure 5C:
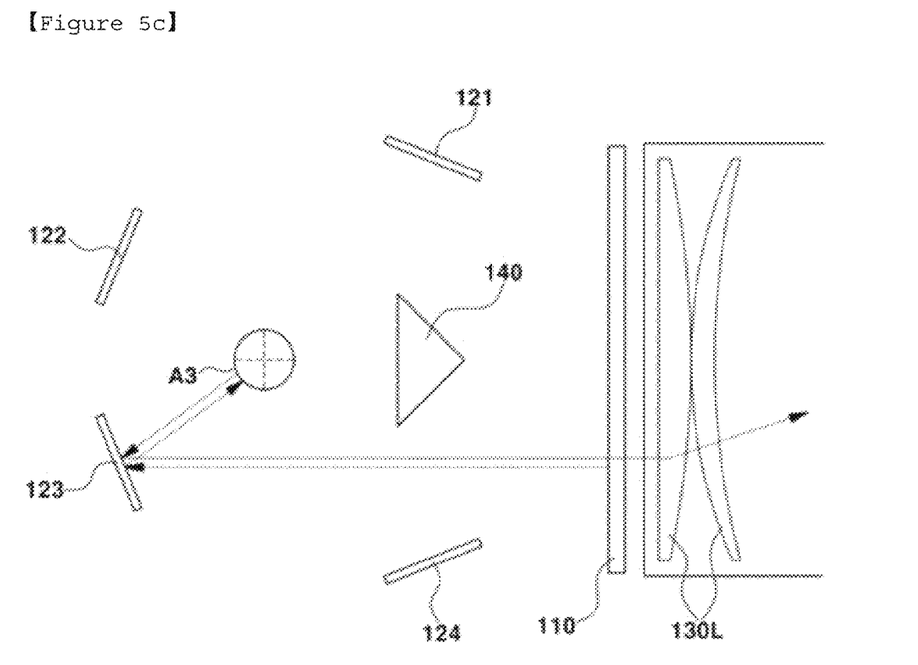

FIG. 5(c) shows the path of light reflected after entering the third area A3 of the cylindrical battery 200.

Referring to the drawing, another part of the light emitted from the first lighting 110 the lens 130L of the camera 130 via the third mirror 123, the third area A3 of the cylindrical battery 200, and the third mirror 123. Specifically, another part of the light emitted from the first lighting 110 is incident on the third mirror 123, then reflected, and incident on the third area A3 of the cylindrical battery 200. The light incident on the third area A3 of the cylindrical battery 200 is reflected again, incident on the third mirror 123, then reflected again, and incident on the lens 130L of the camera 130.

Figure 5D:
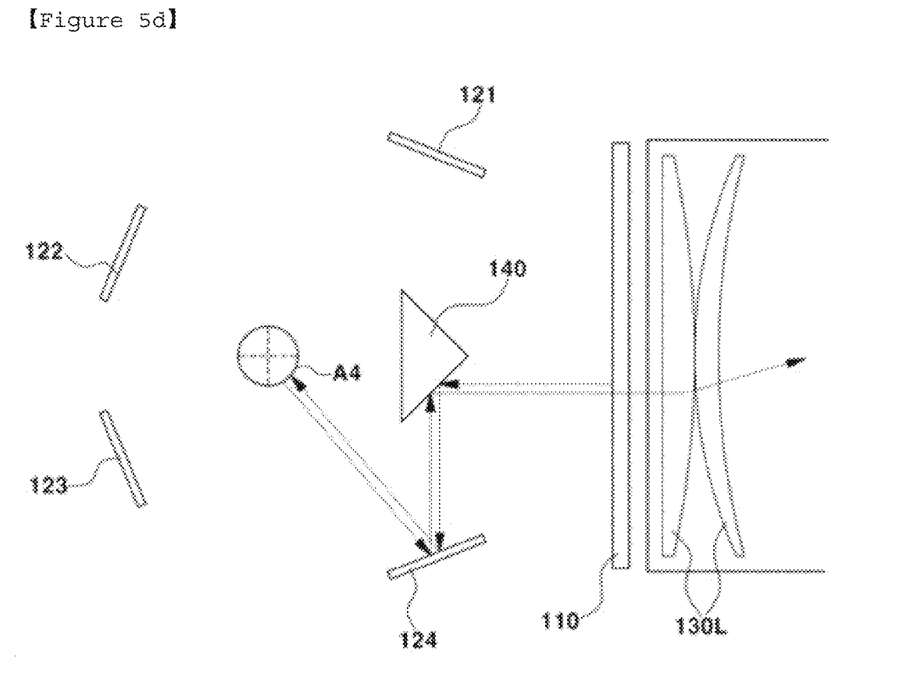

FIG. 5(d) shows the path of light reflected after entering the fourth area A4 of the cylindrical battery 200.

Referring to the drawing, another part of the light emitted from the first lighting 110 is incident on the lens 130L of the camera 130 via the prism 140, the fourth mirror 124, the fourth area A4 of the cylindrical battery 200, the fourth mirror 124, and the prism 140. Specifically, another part of the light emitted from the first lighting 110 is reflected after being incident on the prism 140 and is incident on the fourth mirror 124, and the light incident on the fourth mirror 124 is reflected again, and incident on the fourth area A4 of the cylindrical battery 200. The light incident on the fourth area A4 of the cylindrical battery 200 is reflected and incident on the fourth mirror 124, and the light incident on the fourth mirror 124 is reflected again and incident on the prism 140, then reflected again and incident on the lens 130L of the camera 130.

Although an embodiment of the present invention has been described above as an example, the embodiment of the present invention is not limited to the above embodiment. Those skilled in the art can modify appropriately and implement an embodiment of the present invention such as omission, change, replacement, or addition of other configurations of all or part of the configurations of the present invention, referring to the specification and accompanying drawings, without departing from the technical spirit of the present invention.

In this specification, the orders such as first and second are to distinguish the components from each other and does not imply a priority between the components or imply an absolute order. In some parts of the specification, a first component may be referred to as a second component in other parts of the specification.

The terms and expressions herein should be interpreted broadly and not in a restrictive sense. As used herein, the term "comprising" does not exclude the presence or addition of one or more other components in addition to the recited components.

In this specification, the singular forms include the plural forms unless clearly excluded contextually otherwise.

Each embodiment described herein as an example is combinable with each other, and unless inconsistent, contents described in an embodiment can be similarly can be used in other embodiments, even if not described in other embodiments.

The invention claimed is:

1. A side surface inspection device for a cylindrical battery that has a first area that is a part of a side surface, a second area that is another part of the side surface, a third area that is still another part of the side surface, and a fourth area that is a remaining part of the side surface, the first area, the second area, the third area, and the four area being adjacent to each other and arranged sequentially along a circumference, the side surface inspection device comprising:
a first light configured to emit light in a direction toward the side surface of the cylindrical battery;
a plurality of mirrors including a first mirror, a second mirror, a third mirror, and a fourth mirror that each are configured to reflect light emitted from the first light to be incident on each of the first area, the second area, the third area, and the fourth area, respectively, of the cylindrical battery, and are configured to reflect light reflected by each of the first area, the second area, the third area, and the fourth area, respectively, of the cylindrical battery; and
a camera configured to receive the light reflected by each of the plurality of mirrors and configured to form an image including images of the first area, the second area, the third area, and the fourth area of the cylindrical battery.

2. The side surface inspection device of the cylindrical battery according to claim 1, further comprising:
a prism configured to adjust a path of at least a part of the light emitted from the first light and incident on the plurality of mirrors and at least a part of the light reflected by the cylindrical battery and reflected by the plurality of mirrors again.

3. The side surface inspection device of the cylindrical battery according to claim 2, wherein the prism faces the first light and is between the cylindrical battery and the first light.

4. The side surface inspection device of the cylindrical battery according to claim 3,
wherein the first light faces the first and fourth areas of the cylindrical battery, and
wherein a part of the light emitted from the first light is incident on a lens of the camera via the prism, the first mirror, the first area of the cylindrical battery, the first mirror and the prism, another part of the light emitted from the first lighting is incident on the lens of the camera via the second mirror, the second area of the cylindrical battery and the second mirror, still another part of the light emitted from the first lighting is incident on the lens of the camera via the third mirror, the third area of the cylindrical battery and the third mirror, and still another part of the light emitted from the first lighting is incident on the lens of the camera via the prism, the fourth mirror, the fourth area of the cylindrical battery, the fourth mirror and the prism.

5. The side surface inspection device of the cylindrical battery according to claim 2, wherein the first light is configured to emit light to at least one of the prism and the plurality of mirrors.

6. The side surface inspection device of the cylindrical battery according to claim 1, wherein the first light faces the cylindrical battery and is between the cylindrical battery and a lens of the camera.

7. The side surface inspection device of the cylindrical battery according to claim 1, wherein a lens of the camera is an L-shaped lens, and the camera includes a lens mirror configured to reflect light incident on the lens.

8. The side surface inspection device of the cylindrical battery according to claim 1, further comprising:
a second light at one side of the cylindrical battery.

9. The side surface inspection device of the cylindrical battery according to claim 1, wherein each of the first area, the second area, the third area and the fourth area of the cylindrical battery respectively correspond to the side surface of the cylindrical battery divided into four equal parts.

* * * * *